(12) United States Patent
Dyer et al.

(10) Patent No.: US 12,332,649 B2
(45) Date of Patent: Jun. 17, 2025

(54) REDUCING INCONVENIENCE TO SURROUNDING ROAD USERS CAUSED BY STOPPED AUTONOMOUS VEHICLES

(71) Applicant: Waymo LLC, Mountain View, CA (US)

(72) Inventors: John Wesley Dyer, Mountain View, CA (US); Michael Epstein, Danville, CA (US); Ken Hu, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 231 days.

(21) Appl. No.: 18/074,901

(22) Filed: Dec. 5, 2022

(65) Prior Publication Data

US 2023/0168677 A1    Jun. 1, 2023

Related U.S. Application Data

(63) Continuation of application No. 17/177,278, filed on Feb. 17, 2021, now Pat. No. 11,543,823, which is a
(Continued)

(51) Int. Cl.
  *G05D 1/02* (2020.01)
  *G05D 1/00* (2006.01)
  *G08G 1/01* (2006.01)

(52) U.S. Cl.
  CPC ......... *G05D 1/0212* (2013.01); *G08G 1/012* (2013.01); *G08G 1/0133* (2013.01); *G06Q 2240/00* (2013.01)

(58) Field of Classification Search
  None
  See application file for complete search history.

(56) References Cited

U.S. PATENT DOCUMENTS 9,495,874 B1 * 11/2016 Zhu ................ B60W 60/00133
9,599,477 B1    3/2017 Aula et al.
(Continued)

FOREIGN PATENT DOCUMENTS

JP    2005228127 A    8/2005
JP    2010287093 A    12/2010
(Continued)

OTHER PUBLICATIONS

Notice of Allowance for Korean Patent Application No. 2021-7011902, Oct. 11, 2022.
(Continued)

*Primary Examiner* — Abdhesh K Jha
(74) *Attorney, Agent, or Firm* — Botos Churchill IP Law

(57) ABSTRACT

Aspects of the disclosure provide for reducing inconvenience to other road users caused by stopped autonomous vehicles. As an example, a vehicle having an autonomous driving mode may be stopped at a first location. While the vehicle is stopped, sensor data is received from a perception system of the vehicle. The sensor data may identify a road user. Using the sensor data, a value indicative of a level of inconvenience to the road user caused by stopping the vehicle at the first location may be determined. The vehicle is controlled in the autonomous driving mode to cause the vehicle to move from the first location and in order to reduce the value.

20 Claims, 13 Drawing Sheets

Related U.S. Application Data continuation of application No. 16/141,467, filed on Sep. 25, 2018, now Pat. No. 10,955,848.

(56) References Cited

U.S. PATENT DOCUMENTS

| | | | |
|---|---|---|---|
| 9,682,707 | B1 | 6/2017 | Silver et al. |
| 9,766,626 | B1 | 9/2017 | Zhu et al. |
| 9,805,605 | B2 | 10/2017 | Ramanujam |
| 9,953,283 | B2 | 4/2018 | Sweeney et al. |
| 2005/0201590 | A1 | 9/2005 | Kudo |
| 2016/0170410 | A1 | 6/2016 | Ichikawa et al. |
| 2016/0282874 | A1 | 9/2016 | Kurata et al. |
| 2016/0370194 | A1 | 12/2016 | Colijn et al. |
| 2017/0277191 | A1 | 9/2017 | Fairfield et al. |
| 2017/0344010 | A1 | 11/2017 | Rander et al. |
| 2017/0361835 | A1 | 12/2017 | Tarte et al. |

FOREIGN PATENT DOCUMENTS

| | | |
|---|---|---|
| JP | 2012200818 A | 10/2012 |
| JP | 2016031570 A | 3/2016 |
| JP | 2017226371 A | 12/2017 |
| WO | 2016183525 A1 | 11/2016 |
| WO | 2017056224 A1 | 4/2017 |

OTHER PUBLICATIONS

Notice of Reasons for Rejection for Japanese Patent Application No. 2021-514557, Jun. 21, 2022.

The Extended European Search Report for European Patent Application No. 19865410.5, Mar. 3, 2022.

"International Search Report and Written Opinion for Application No. PCT/US2019/052380 dated Jan. 6, 2020", 9 pages.

Decision to Grant a Patent for Japanese Patent Application No. 2021-514557, Jan. 5, 2023.

Notice of Allowance for Chinese Patent Application No. 201980063083.X , Apr. 16, 2024, 7 Pages.

* cited by examiner

1400

REDUCING INCONVENIENCE TO SURROUNDING ROAD USERS CAUSED BY STOPPED AUTONOMOUS VEHICLES

CROSS REFERENCE TO RELATED APPLICATIONS

The present application is a continuation of U.S. patent application Ser. No. 17/177,278, filed Feb. 17, 2021, which is a continuation of U.S. patent application Ser. No. 16/141,467, filed Sep. 25, 2018, issued as U.S. Pat. No. 10,955,848, the entire disclosures of which are incorporated herein by reference.

BACKGROUND

Autonomous vehicles, such as vehicles that do not require a human driver, can be used to aid in the transport of passengers or items from one location to another. Such vehicles may operate in a fully autonomous mode where passengers may provide some initial input, such as a pickup or destination location, and the vehicle maneuvers itself to that location.

When a person (or user) wants to be physically transported between two locations via a vehicle, they may use any number of transportation services. To date, these services typically involve a human driver who is given dispatch instructions to a location to pick up the user. In many cases, the human driver and the user are able to arrange an exact location for the user to be picked up. In addition, when waiting for passengers are stopped and waiting for a passenger, human drivers are typically able to recognize when they are inconveniencing other road users such as other vehicles, pedestrians, bicyclists, etc. in their environment. For instance, a vehicle can block or inconvenience other vehicles behind it, vehicles approaching from an adjacent lane, vehicles attempting to park or unpark, bicyclists and/or bicycle lanes, pedestrians attempting to cross, and so on. As such, a human driver may be able to determine how to best reduce inconvenience to other drivers. This is not readily achievable in the case of autonomous vehicles which do not have a human driver.

BRIEF SUMMARY

One aspect of the disclosure provides a method of reducing inconvenience to other road users for autonomous vehicles. The method includes stopping, by one or more processors, a vehicle having an autonomous driving mode at a first location; while the vehicle is stopped, receiving, by one or more processors, sensor data from a perception system of the vehicle, the sensor data identifying a road user; determining, by the one or more processors, using the sensor data, a value indicative of a level of inconvenience to the road user caused by stopping the vehicle at the first location; and controlling, by the one or more processors, the vehicle in the autonomous driving mode to cause the vehicle to move from the first location and in order to reduce the value.

In one example, the sensor data indicates observed behavior for the other road user, and the method further includes receiving output of a behavior model predicting future behavior of the other road user and comparing the future behavior to the observed behavior, and wherein the determining the value is further based on the comparison. In another example, the sensor data indicates observed behavior for the other road user, and the method further includes receiving first output of a behavior model predicting a first future behavior of the other road user, after receiving the first output, receiving second output of the behavior model predicting a second future behavior of the road user; and comparing the first future behavior to the second future behavior, and wherein the determining the value is further based on the comparison. In this example, the second output further indicates that the second future behavior is responsive to the vehicle, and determining the value is further based on the indication that the second future behavior is responsive to the vehicle. In another example, determining the value includes inputting the sensor data into a model which outputs the value. In this example, the method also includes determining that the vehicle is inconveniencing the road user based on output from a behavior model predicting a first future behavior of the other road user, and wherein the sensor data is input into the model based on the determination that the vehicle is inconveniencing the road user. In another example, controlling the vehicle is based on whether the road user is in a lane adjacent to a lane of the vehicle. In another example, controlling the vehicle is based on whether the road user is in a lane of the vehicle and behind the vehicle. In another example, the vehicle is stopped in the first location in order to wait for a passenger, and the method also includes sending a message to a client computing device of the passenger based on the controlling. In another example, the method also includes determining that the value meets a threshold, and wherein controlling the vehicle is further based on the determination that the value meets the threshold.

Another aspect of the disclosure provides a system for reducing inconvenience to other road users caused by stopped autonomous vehicles. The system includes one or more processors configured to stop a vehicle having an autonomous driving mode at a first location; while the vehicle is stopped, receive sensor data from a perception system of the vehicle, the sensor data identifying a road user; determine using the sensor data, a value indicative of a level of inconvenience to the road user caused by stopping the vehicle at the first location; and controlling, by the one or more processors, the vehicle in the autonomous driving mode to cause the vehicle to move from the first location and in order to reduce the value.

In one example, the sensor data indicates observed behavior for the other road user, and the one or more processors are also configured to receive output of a behavior model predicting future behavior of the other road user and compare the future behavior to the observed behavior, and wherein determining the value is further based on the comparison. In another example, the sensor data indicates observed behavior for the other road user, and the one or more processors are also configured to receive first output of a behavior model predicting a first future behavior of the other road user; after receiving the first output, receive second output of the behavior model predicting a second future behavior of the road user; and compare the first future behavior to the second future behavior, and wherein determining the value is also based on the comparison. In this example, second output also indicates that the second future behavior is responsive to the vehicle, and the one or more processors are also configured to determine the value also based on the indication that the second future behavior is responsive to the vehicle. In another example, the one or more processors are also configured to determine the value includes inputting the sensor data into a model which outputs the value. In this example, the one or more processors are also configured to determine that the vehicle is inconveniencing the road user based on output from a behavior model predicting a first future behavior of the other road user, and the sensor data is input into the model based on the determination that the vehicle is inconveniencing the road user. In another example, the one or more processors are also configured to control the vehicle also based on whether the road user is in a lane adjacent to a lane of the vehicle. In another example, the one or more processors are also configured to control the vehicle also based on whether the road user is in a lane of the vehicle and behind the vehicle. In another example, the vehicle is stopped in the first location in order to wait for a passenger, and the one or more processors are further configured to send a message to a client computing device of the passenger based on the controlling. In another example, the one or more processors are further configured to determine that the value meets a threshold, and to control the vehicle further based on the determination that the value meets the threshold.

DETAILED DESCRIPTION

Overview

Figure 1:
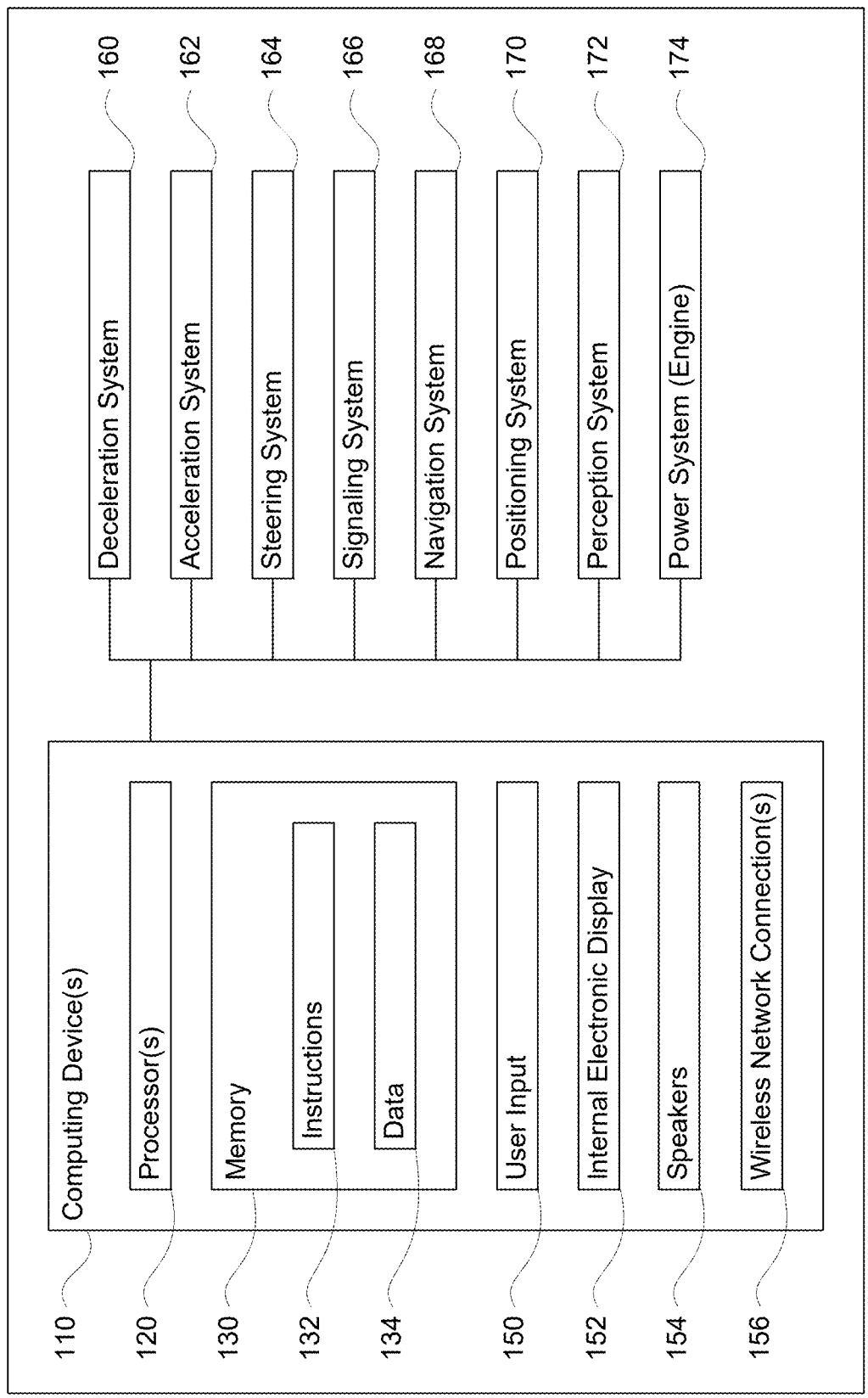
FIG. 1 is a functional diagram of an example vehicle in accordance with aspects of the disclosure.

The technology relates to enabling autonomous vehicles to make independent determinations as to whether to move from a pick up location when waiting for a passenger to arrive. This in tur-n may reduce inconvenience to other road users in the surrounding environment of an autonomous vehicle stopped and waiting for one or more passengers. For instance, as noted above, a vehicle can block or inconvenience other vehicles behind it, vehicles approaching from an adjacent lane, vehicles attempting to park or unpark, bicyclists and/or bicycle lanes, pedestrians attempting to cross, and so on.

As one approach, when stopped, an autonomous vehicle may request assistance at increasing time intervals from remote operators as to whether the autonomous should move along based on whether the vehicle is blocking or otherwise inconveniencing other road users. In response, the remote operator may review the vehicle's surroundings and instruct the autonomous vehicle to stay put or move along depending on the flow of traffic around the vehicle. Of course, this back-and-forth can take time, which can cause annoyance and inconvenience to other road users. To reduce or even eliminate the need for the autonomous vehicles to call a remote operator in such situations, the vehicle's computing devices may identify situations in which the vehicle is inconveniencing other drivers and thereafter attempt to reduce that inconvenience.

In order to do so, the vehicle's computing devices may receive sensor data from the vehicle's perception system. The perception system may include various sensors and may be configured to detect and identify objects, such as other road users, in the vehicle's environment. This information may then be used to determine whether the vehicle is inconveniencing other road users, such as by blocking traffic or causing other road users to have to move around the vehicle. For instance, the vehicle's computing devices may determine whether the vehicle is preventing other vehicles, pedestrians, and bicyclists from proceeding or causing those road users to have to drive around the vehicle.

The vehicle's computing devices may receive output from various behavior prediction models. For instance, for each road user of a given type detected by the vehicle's perception system, the vehicle's computing devices may use a corresponding behavior prediction model for that type of road user to estimate a future behavior of that road user. In some instances, these behavior models may also identify whether the other road user's behavior is responsive to the vehicle. If the predictions change over time or if a prediction does not sufficiently correspond with the actual behavior of the other road user as the other road user approaches the vehicle and these changes or differences are caused by the vehicle, this may indicate that the vehicle is inconveniencing the other road user.

In order to allow the vehicle's computing devices to quickly assess the inconvenience, a model may be used to provide an inconvenience value for only those other road users detected by the vehicle's perception system as being inconvenienced by the vehicle as discussed above. The model may be trained by using sensor data generated by a vehicle's perception system with labeled instances of when the vehicle is identified to be inconveniencing other traffic. The model may be trained to provide a value indicative of how likely the vehicle is inconveniencing the aforementioned road users. Alternatively, the model may be used to determine whether the vehicle is inconveniencing any other road users whenever the vehicle is stopped, regardless of the output of the various behavior models.

The output of the model may be used to determine an appropriate response. For instance, the value may be compared to a threshold value to determine whether the vehicle is inconveniencing other road users such that the vehicle should move. If the threshold is not met, the vehicle's computing devices may respond by keeping the vehicle at its current location. If the threshold is met, the vehicle's computing devices may respond by moving the vehicle in order to reduce the value. In addition, how the vehicle is moved may depend on how the vehicle is inconveniencing other traffic. In yet another example, the vehicle's computing devices may attempt to search for a location with a lower value from the model.

The features described herein may enable autonomous vehicles to make independent determinations as to whether to move from a pick up location when waiting for a passenger to arrive. This may reduce or even eliminate the need for remote operators to make these decisions while also reducing the time it takes for the vehicle to react to such situations. This reduction in time may also increase the safety of the vehicle which may be able to respond much faster as the vehicle is able to continuously monitor its environment and anticipate inconvenience to other road users. At the same time, by allowing the vehicle to automatically determine that it is blocking or inconveniencing other road users, the vehicle may be more responsive to its environment and less likely to block, inconvenience, and in some cases, annoy, other road users.

Example Systems

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, busses, recreational vehicles, etc. The vehicle may have one or more computing devices, such as computing device 110 containing one or more processors 120, memory 130 and other components typically present in general purpose computing devices.

The memory 130 stores information accessible by the one or more processors 120, including instructions 132 and data 134 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. As an example, data 134 of memory 130 may store predefined scenarios. A given scenario may identify a set of scenario requirements including a type of object, a range of locations of the object relative to the vehicle, as well as other factors such as whether the autonomous vehicle is able to maneuver around the object, whether the object is using a turn signal, the condition of a traffic light relevant to the current location of the object, whether the object is approaching a stop sign, etc. The requirements may include discrete values, such as "right turn signal is on" or "in a right turn only lane", or ranges of values such as "having an heading that is oriented at an angle that is 30 to 60 degrees offset from a current path of vehicle 100." In some examples, the predetermined scenarios may include similar information for multiple objects.

The one or more processor 120 may be any conventional processors, such as commercially available CPUs. Alternatively, the one or more processors may be a dedicated device such as an ASIC or other hardware-based processor. Although FIG. 1 functionally illustrates the processor, memory, and other elements of computing device 110 as being within the same block, it will be understood by those of ordinary skill in the art that the processor, computing device, or memory may actually include multiple processors, computing devices, or memories that may or may not be stored within the same physical housing. As an example, internal electronic display 152 may be controlled by a dedicated computing device having its own processor or central processing unit (CPU), memory, etc. which may interface with the computing device 110 via a high-bandwidth or other network connection. In some examples, this computing device may be a user interface computing device which can communicate with a user's client device. Similarly, the memory may be a hard drive or other storage media located in a housing different from that of computing device 110. Accordingly, references to a processor or computing device will be understood to include references to a collection of processors or computing devices or memories that may or may not operate in parallel.

Computing device 110 may all of the components normally used in connection with a computing device such as the processor and memory described above as well as a user input 150 (e.g., a mouse, keyboard, touch screen and/or microphone) and various electronic displays (e.g., a monitor having a screen or any other electrical device that is operable to display information). In this example, the vehicle includes an internal electronic display 152 as well as one or more speakers 154 to provide information or audio visual experiences. In this regard, internal electronic display 152 may be located within a cabin of vehicle 100 and may be used by computing device 110 to provide information to passengers within the vehicle 100. In addition to internal speakers, the one or more speakers 154 may include external speakers that are arranged at various locations on the vehicle in order to provide audible notifications to objects external to the vehicle 100.

In one example, computing device 110 may be an autonomous driving computing system incorporated into vehicle 100. The autonomous driving computing system may capable of communicating with various components of the vehicle. For example, returning to FIG. 1, computing device 110 may be in communication with various systems of vehicle 100, such as deceleration system 160 (for controlling braking of the vehicle), acceleration system 162 (for controlling acceleration of the vehicle), steering system 164 (for controlling the orientation of the wheels and direction of the vehicle), signaling system 166 (for controlling turn signals), navigation system 168 (for navigating the vehicle to a location or around objects), positioning system 170 (for determining the position of the vehicle), perception system 172 (for detecting objects in the vehicle's environment), and power system 174 (for example, a battery and/or gas or diesel powered engine) in order to control the movement, speed, etc. of vehicle 100 in accordance with the instructions 132 of memory 130 in an autonomous driving mode which does not require or need continuous or periodic input from a passenger of the vehicle. Again, although these systems are shown as external to computing device 110, in actuality, these systems may also be incorporated into computing device 110, again as an autonomous driving computing system for controlling vehicle 100.

The computing device 110 may control the direction and speed of the vehicle by controlling various components. By way of example, computing device 110 may navigate the vehicle to a destination location completely autonomously using data from the map information and navigation system 168. Computing devices 110 may use the positioning system 170 to determine the vehicle's location and perception system 172 to detect and respond to objects when needed to reach the location safely. In order to do so, computing devices 110 may cause the vehicle to accelerate (e.g., by increasing fuel or other energy provided to the engine by acceleration system 162), decelerate (e.g., by decreasing the fuel supplied to the engine, changing gears, and/or by applying brakes by deceleration system 160), change direction (e.g., by turning the front or rear wheels of vehicle 100 by steering system 164), and signal such changes (e.g., by lighting turn signals of signaling system 166). Thus, the acceleration system 162 and deceleration system 160 may be a part of a drivetrain that includes various components between an engine of the vehicle and the wheels of the vehicle. Again, by controlling these systems, computing devices 110 may also control the drivetrain of the vehicle in order to maneuver the vehicle autonomously.

As an example, computing device 110 may interact with deceleration system 160 and acceleration system 162 in order to control the speed of the vehicle. Similarly, steering system 164 may be used by computing device 110 in order to control the direction of vehicle 100. For example, if vehicle 100 configured for use on a road, such as a car or truck, the steering system may include components to control the angle of wheels to turn the vehicle. Signaling system 166 may be used by computing device 110 in order to signal the vehicle's intent to other drivers or vehicles, for example, by lighting turn signals or brake lights when needed.

Navigation system 168 may be used by computing device 110 in order to determine and follow a route to a location. In this regard, the navigation system 168 and/or data 134 may store map information, e.g., highly detailed maps that computing devices 110 can use to navigate or control the vehicle. As an example, these maps may identify the shape and elevation of roadways, lane markers, intersections, crosswalks, speed limits, traffic signal lights, buildings, signs, real time or historical traffic information, vegetation, or other such objects and information. The lane markers may include features such as solid or broken double or single lane lines, solid or broken lane lines, reflectors, etc. A given lane may be associated with left and right lane lines or other lane markers that define the boundary of the lane. Thus, most lanes may be bounded by a left edge of one lane line and a right edge of another lane line. As noted above, the map information may store known traffic or congestion information and/or and transit schedules (train, bus, etc.) from a particular pickup location at similar times in the past. This information may even be updated in real time by information received by the computing devices 110.

Figure 2:
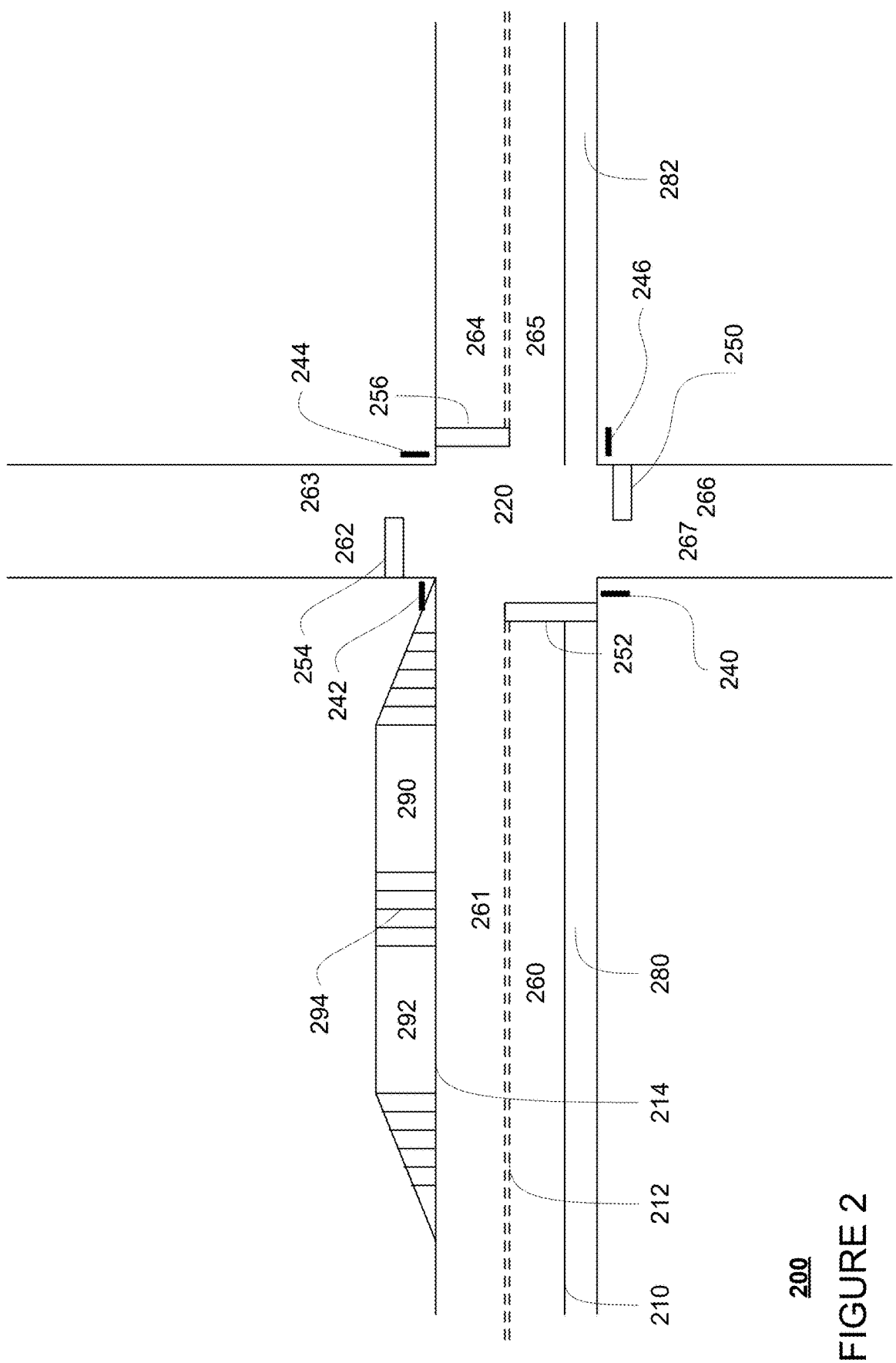
FIG. 2 is an example representation of map information in accordance with aspects of the disclosure.

FIG. 2 is an example of map information 200 for a section of roadway including intersection 220. In this example, map information 200 depicts a portion of the map information that includes information identifying the shape, location, and other characteristics of lane markers or lane lines 210, 212, 214, stop signs 240, 242, 244, 246, as well as stop lines 250, 252, 254, 256. The lane lines may also define various lanes 260, 261, 264, 265, implied by the width of a road, such as lanes 262, 263, 266, 267, and/or lanes 260-267 may also be explicitly identified in the map information 200. In this example, map information 200 also identifies bicycle lanes 280, 282. In addition to these features, the map information may also include information that identifies the direction of traffic and speed limits for each lane as well as information that allows the computing devices 110 to determine whether the vehicle has the right of way to complete a particular maneuver (i.e. complete a turn or cross a lane of traffic or intersection), as well as other features such as curbs, buildings, waterways, vegetation, signs, etc.

The map information may also store predetermined stopping locations including pickup locations and drop off locations. Pickup locations may refer to locations where the autonomous vehicle stops to wait to pick up a passenger for a trip. Drop off locations may refer to locations where the autonomous vehicle stops to allow for a passenger to exit the vehicle after a trip. Other stopping locations, such as those where the vehicle stops, allows the passenger to exit and waits for the passenger to return are also possible. Each of these may simply be parking locations that are discrete, pre-determined pickup and drop off locations, and in some instances, hand-selected by a human operator or learned by a computing device over time. In this regard, each stopping location may be a locations where a vehicle could stop selected through some manual or automated analysis of the characteristics of each location. In the example of FIG. 2, the map information includes stopping locations 290, 292. However, in some locations, such as in neighborhoods or narrow roads, as in the example of FIG. 2, there may be few or no "fixed" or predesignated parking spaces or areas.

Although the detailed map information is depicted herein as an image-based map, the map information need not be entirely image based (for example, raster). For example, the detailed map information may include one or more roadgraphs or graph networks of information such as roads, lanes, intersections, and the connections between these features. Each feature may be stored as graph data and may be associated with information such as a geographic location and whether or not it is linked to other related features, for example, a stop sign may be linked to a road and an intersection, etc. In some examples, the associated data may include grid-based indices of a roadgraph to allow for efficient lookup of certain roadgraph features.

The perception system 172 also includes one or more components for detecting objects external to the vehicle such as other vehicles, obstacles in the roadway, traffic signals, signs, trees, etc. For example, the perception system 172 may include one or more LIDAR sensors, sonar devices, radar units, cameras and/or any other detection devices that record data which may be processed by computing devices 110. The sensors of the perception system may detect objects and their characteristics such as location, orientation, size, shape, type (for instance, vehicle, pedestrian, bicyclist, etc.), heading, and speed of movement, etc. The raw data from the sensors and/or the aforementioned characteristics can be quantified or arranged into a descriptive function, vector, and or bounding box and sent for further processing to the computing devices 110 periodically and continuously as it is generated by the perception system 172. As discussed in further detail below, computing devices 110 may use the positioning system 170 to determine the vehicle's location and perception system 172 to detect and respond to objects when needed to reach the location safely.

Figure 3:
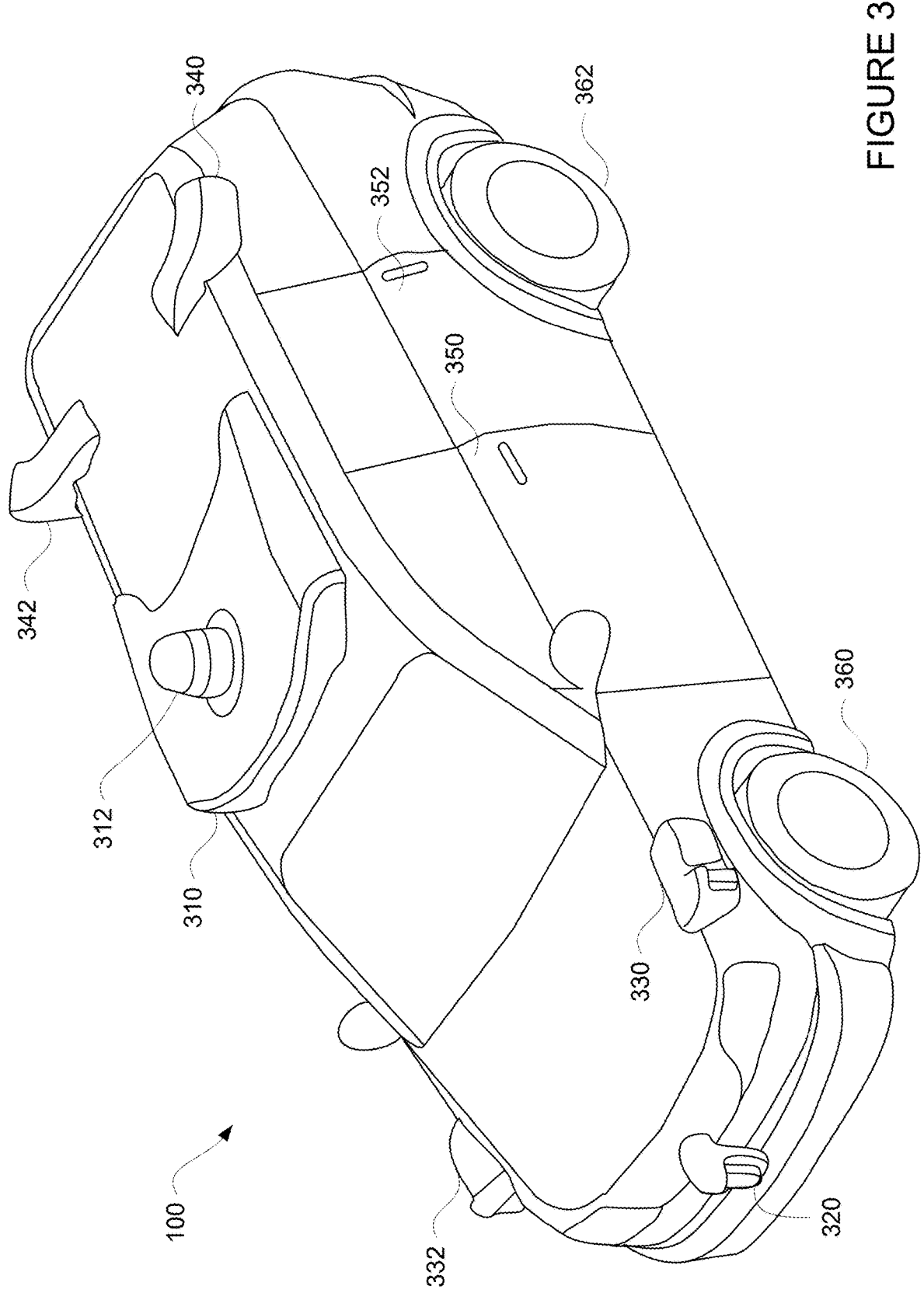
FIG. 3 is an example external view of a vehicle in accordance with aspects of the disclosure.

For instance, FIG. 3 is an example external view of vehicle 100. In this example, roof-top housing 310 and dome housing 312 may include a LIDAR sensor as well as various cameras and radar units. In addition, housing 320 located at the front end of vehicle 100 and housings 330, 332 on the driver's and passenger's sides of the vehicle may each store a LIDAR sensor. For example, housing 330 is located in front of driver door 350. Vehicle 100 also includes housings 340, 342 for radar units and/or cameras also located on the roof of vehicle 100. Additional radar units and cameras (not shown) may be located at the front and rear ends of vehicle 100 and/or on other positions along the roof or roof-top housing 310. Vehicle 100 also includes many features of a typical passenger vehicle such as doors 350, 352, wheels 360, 362, etc.

Once a nearby object is detected, computing devices 110 and/or perception system 172 may determine the object's type, for example, a traffic cone, pedestrian, a vehicle (such as a passenger car, truck, bus, etc.), bicycle, etc. Objects may be identified by various models which may consider various characteristics of the detected objects, such as the size of an object, the speed of the object (bicycles do not tend to go faster than 40 miles per hour or slower than 0.1 miles per hour), the heat coming from the bicycle (bicycles tend to have rider that emit heat from their bodies), etc. In addition, the object may be classified based on specific attributes of the object, such as information contained on a license plate, bumper sticker, or logos that appear on the vehicle.

In one example, computing devices 110 may be operable to predict another vehicle's future movement based solely on the other vehicle's instant direction, acceleration/deceleration and velocity, e.g., that the other vehicle's current direction and movement will continue. However, memory 130 may also store behavior models that provide the probability of one or more actions being taken a detected object. To increase the usefulness of these behavior models, each behavior model may be associated with a specific type of object. For instance, one type of behavior model may be used for objects identified as pedestrians, another type of behavior model may be used for objects identified as vehicles, another type of behavior may be used for objects identified as bicycles or bicyclists, etc. The behavior models may be used by the computing devices 110 in order to predict a detected object future movement by analyzing data relating to the other vehicle's current surroundings (such as the detected or estimated size, shape, location, orientation, heading, velocity, acceleration or deceleration, change in acceleration or deceleration, etc.), and determining how that other object will likely respond to those surroundings. In this regard, the behavior models may function from an object-centric, view of the object's environment, in that the system determines what the other objects are perceiving in order to better predict how those objects will behave. In this regard, in at least some instances, the behavior models may also indicate whether the predicted behavior for an object is responsive to a particular other object including the vehicle 100.

Figure 4:
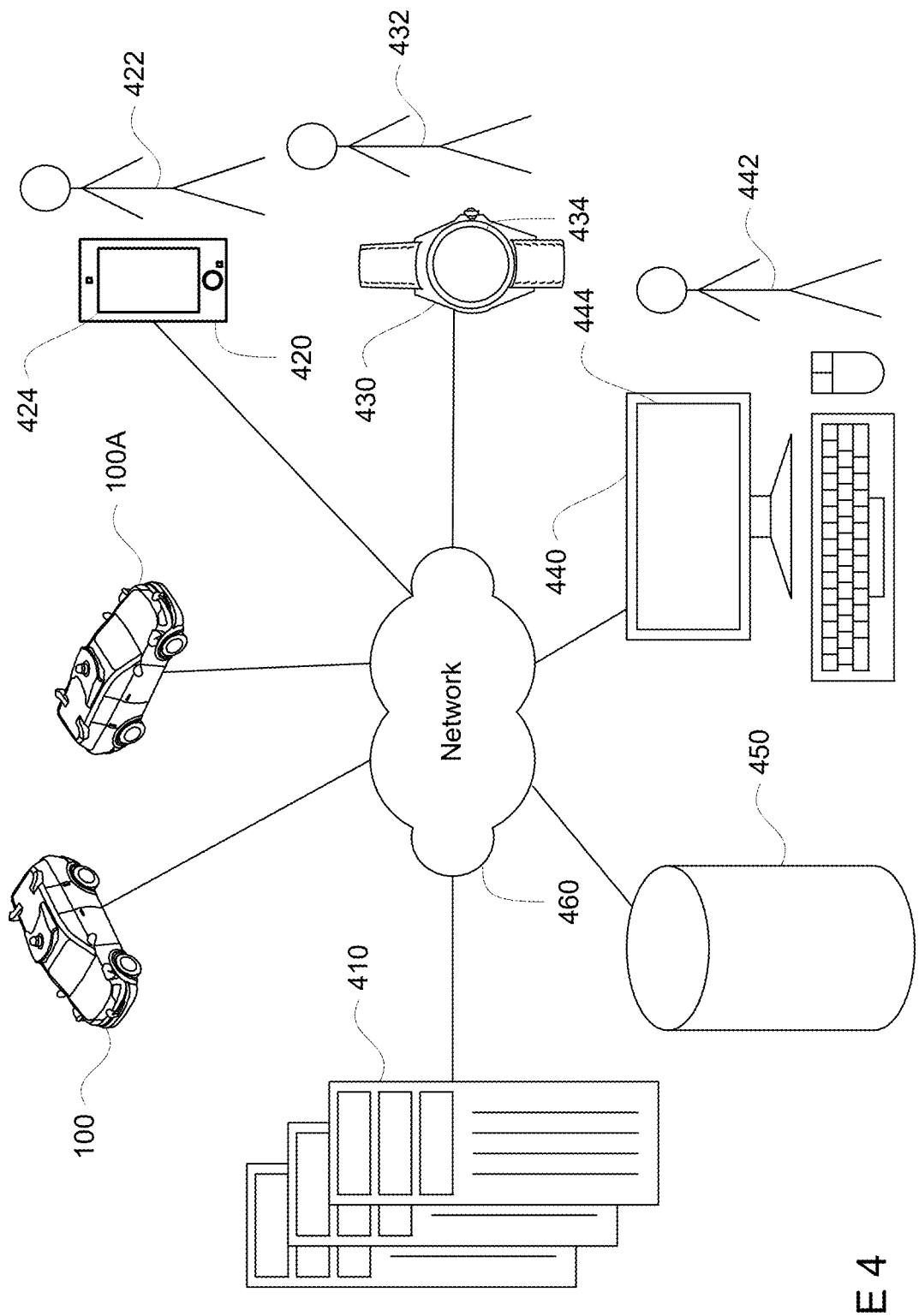
FIG. 4 is an example pictorial diagram of a system in accordance with aspects of the disclosure.
Figure 5:
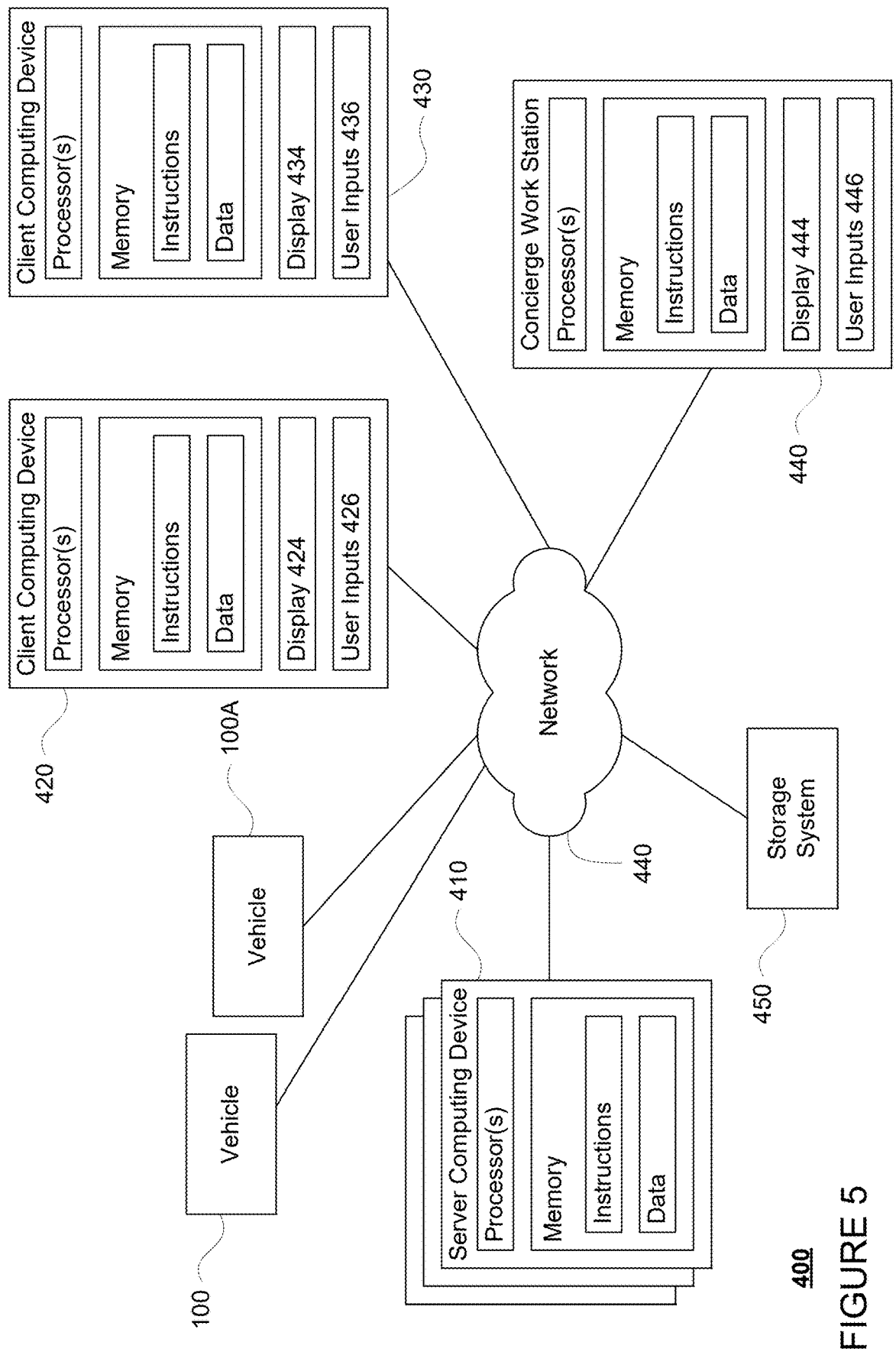
FIG. 5 is an example functional diagram of a system in accordance with aspects of the disclosure.

The one or more computing devices 110 of vehicle 100 may also receive or transfer information to and from other computing devices, for instance using wireless network connections 156. The wireless network connections may include, for instance, BLUETOOTH®, Bluetooth LE, LTE, cellular, near field communications, etc. and various combinations of the foregoing, FIGS. 4 and 5 are pictorial and functional diagrams, respectively, of an example system 400 that includes a plurality of computing devices 410, 420, 430, 440 and a storage system 450 connected via a network 460. System 400 also includes vehicle 100, and vehicle 100A which may be configured similarly to vehicle 100. Although only a few vehicles and computing devices are depicted for simplicity, a typical system may include significantly more.

As shown in FIG. 4, each of computing devices 410, 420, 430, 440 may include one or more processors, memory, data and instructions. Such processors, memories, data and instructions may be configured similarly to one or more processors 120, memory 130, data 134, and instructions 132 of computing device 110.

The network 460, and intervening nodes, may include various configurations and protocols including short range communication protocols such as BLUETOOTH®, Bluetooth LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, one or more computing devices 110 may include a server having a plurality of computing devices, e.g., a load balanced server farm, that exchange information with different nodes of a network for the purpose of receiving, processing and transmitting the data to and from other computing devices. For instance, one or more computing devices 410 may include one or more server computing devices that are capable of communicating with one or more computing devices 110 of vehicle 100 or a similar computing device of vehicle 100A as well as client computing devices 420, 430, 440 via the network 460. For example, vehicles 100 and 100A may be a part of a fleet of vehicles that can be dispatched by server computing devices to various locations. In this regard, the vehicles of the fleet may periodically send the server computing devices location information provided by the vehicle's respective positioning systems and the one or more server computing devices may track the locations of the vehicles.

In addition, server computing devices 410 may use network 460 to transmit and present information to a user, such as user 422, 432, 442 on a display, such as displays 424, 434, 444 of computing devices 420, 430, 440. In this regard, computing devices 420, 430, 440 may be considered client computing devices.

As shown in FIG. 5, each client computing device 420, 430, 440 may be a personal computing device intended for use by a user 422, 432, 442, and have all of the components normally used in connection with a personal computing device including a one or more processors (e.g., a central processing unit (CPU)), memory (e.g., RAM and internal hard drives) storing data and instructions, a display such as displays 424, 434, 444 (e.g., a monitor having a screen, a touch-screen, a projector, a television, or other device that is operable to display information), and user input devices 426, 436, 446 (e.g. a mouse, keyboard, touchscreen or microphone). The client computing devices may also include a camera for recording video streams, speakers, a network interface device, and all of the components used for connecting these elements to one another.

Although the client computing devices 420, 430, and 440 may each comprise a fill-sized personal computing device, they may alternatively comprise mobile computing devices capable of wirelessly exchanging data with a server over a network such as the Internet. By way of example only, client computing device 420 may be a mobile phone or a device such as a wireless-enabled PDA, a tablet PC, a wearable computing device or system, or a netbook that is capable of obtaining information via the Internet or other networks. In another example, client computing device 430 may be a wearable computing system, shown as a wrist watch in FIG. 4. As an example the user may input information using a small keyboard, a keypad, microphone, using visual signals with a camera, or a touch screen.

In some examples, client computing device 440 may be remote operator work station used by an administrator to provide remote operator services to users such as users 422 and 432. For example, a remote operator 442 may use the remote operator work station 440 to communicate via a telephone call or audio connection with users through their respective client computing devices and/or vehicles 100 or 100A in order to ensure the safe operation of vehicles 100 and 100A and the safety of the users as described in further detail below. Although only a single remote operator work station 440 is shown in FIGS. 4 and 5, any number of such work stations may be included in a typical system.

Storage system 450 may store various types of information as described in more detail below. This information may be retrieved or otherwise accessed by a server computing device, such as one or more server computing devices 410, in order to perform some or all of the features described herein. For example, the information may include user account information such as credentials (e.g., a username and password as in the case of a traditional single-factor authentication as well as other types of credentials typically used in multi-factor authentications such as random identifiers, biometrics, etc.) that can be used to identify a user to the one or more server computing devices. The user account information may also include personal information such as the user's name, contact information, identifying information of the user's client computing device (or devices if multiple devices are used with the same user account), as well as age information, health information, and user history information about how long it has taken the user to enter or exit vehicles in the past as discussed below.

The storage system 450 may also store routing data for generating and evaluating routes between locations. For example, the routing information may be used to estimate how long it would take a vehicle at a first location to reach a second location. In this regard, the routing information may include map information, not necessarily as particular as the detailed map information described above, but including roads, as well as information about those road such as direction (one way, two way, etc.), orientation (North, South, etc.), speed limits, as well as traffic information identifying expected traffic conditions, etc.

The storage system 450 may also store information which can be provided to client computing devices for display to a user. For instance, the storage system 450 may store predetermined distance information for determining an area at which a vehicle is likely to stop for a given pickup or destination location. The storage system 450 may also store graphics, icons, and other items which may be displayed to a user as discussed below.

As with memory 130, storage system 450 can be of any type of computerized storage capable of storing information accessible by the server computing devices 410, such as a hard-drive, memory card, ROM, RAM, DVD, CD-ROM, write-capable, and read-only memories. In addition, storage system 450 may include a distributed storage system where data is stored on a plurality of different storage devices which may be physically located at the same or different geographic locations. Storage system 450 may be connected to the computing devices via the network 460 as shown in FIG. 4 and/or may be directly connected to or incorporated into any of the computing devices 110, 410, 420,430, 440, etc.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

In one aspect, a user may download an application for requesting a vehicle to a client computing device. For example, users 422 and 432 may download the application via a link in an email, directly from a website, or an application store to client computing devices 420 and 430. For example, client computing device may transmit a request for the application over the network, for example, to one or more server computing devices 410, and in response, receive the application. The application may be installed locally at the client computing device.

The user may then use his or her client computing device to access the application and request a vehicle. As an example, a user such as user 432 may use client computing device 430 to send a request to one or more server computing devices 410 for a vehicle. As part of this, the user may identify a pickup location, a destination location, and, in some cases, one or more intermediate stopping locations anywhere within a service area where a vehicle can stop.

These pickup and destination locations may be predefined (e.g. specific areas of a parking lot, etc.) or may simply be any location within a service area of the vehicles. As an example, a pickup location can be defaulted to the current location of the user's client computing device, or can be input by the user at the user's client device. For instance, the user may enter an address or other location information or select a location on a map to select a pickup location. Once the user has selected one or more of a pickup and/or destination locations, the client computing device 420 may send the location or locations to one or more server computing devices of the centralized dispatching system. In response, one or more server computing devices, such as server computing device 410, may select a vehicle, such as vehicle 100, for instance based on availability and proximity to the user. The server computing device 410 may then assign the user as the passenger for the vehicle 100, dispatch the selected vehicle (here vehicle 100) to pick up to the assigned passenger. This may include by providing the vehicle's computing devices 110 with the pickup and/or destination locations specified by the assigned passenger as well as information that can be used by the computing devices 110 of vehicle 100 to authenticate the client computing device, such as client computing device 430.

Thereafter, the computing devices 110 mXay maneuver vehicle 100 towards the pickup location and, after picking up the passenger, towards the destination location. Once the vehicle is within a predetermined distance of a pickup or drop off location, such as 50 meters or more or less, the computing devices 110 may begin to look for a place to stop and allow a passenger to enter or exit the vehicle. In some instances, the vehicle may pull towards a curb partially in a lane, in a lane, in front of a driveway or parking spot. While it may be appropriate in some circumstances to stop in such locations, this may cause inconvenience to other road users.

Figure 6:
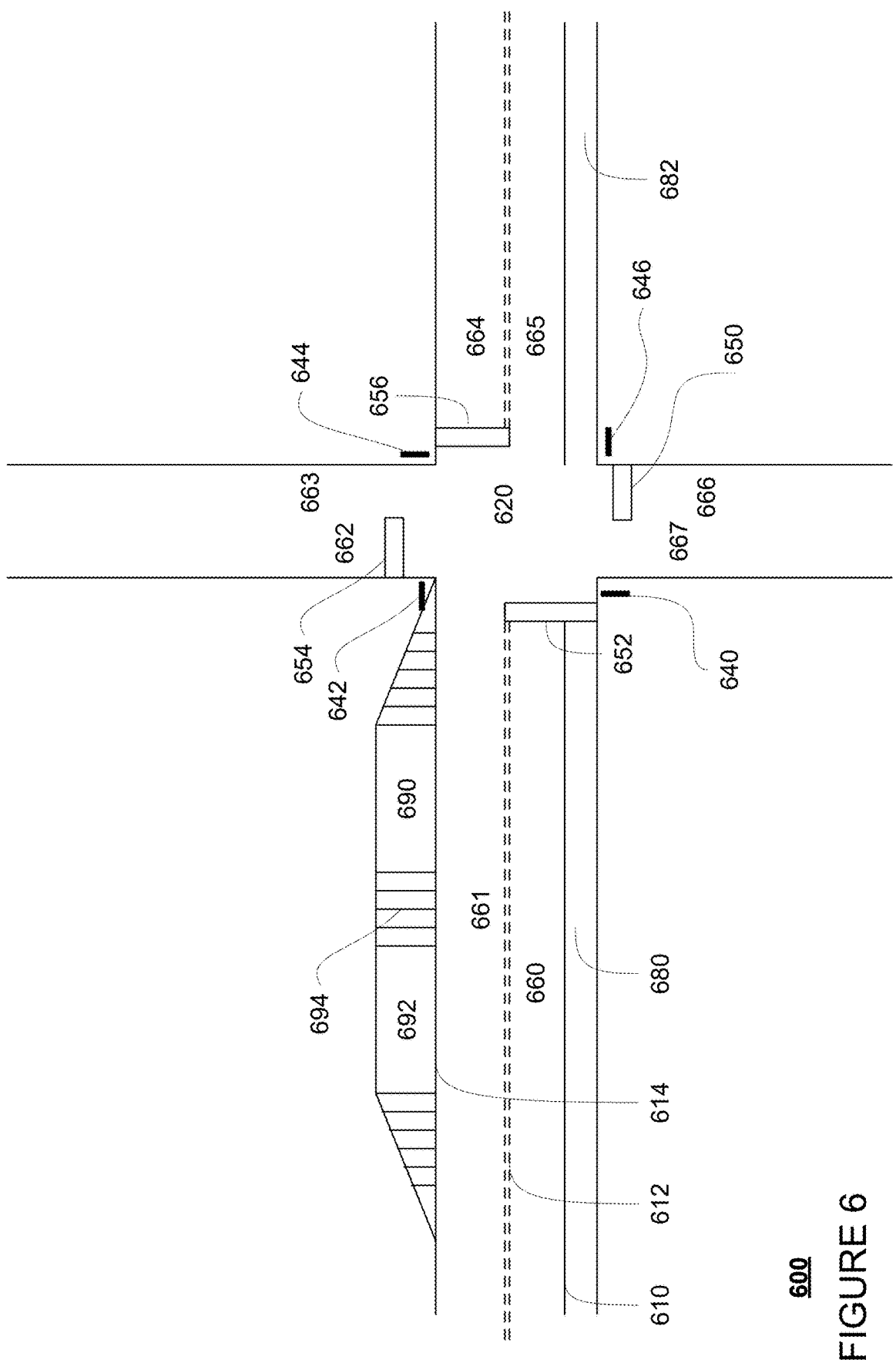
FIG. 6 is a view of a section of roadway in accordance with aspects of the disclosure.

FIG. 6 is an example 600 bird's eye view of a section of roadway corresponding to map information 200. In this example, the shape location and other characteristics of intersection 620, lane lines 610, 612, 614, stop signs 640, 642, 644, 646, stop lines 650, 652, 654, 656, lanes 660-268, bicycle lanes 680, 682, and parking spots 690, 692 may generally correspond to the shape location and other characteristics of intersection 220, lane lines 210, 212, 214, stop signs 240, 242, 244, 246, stop lines 250, 252, 254, 256, lanes 260-268, bicycle lanes 280, 282, and stopping locations 290, 292, respectively. FIGS. 7-10, discussed further below provide examples situations in which a vehicle can block or inconvenience other vehicles when stopped and waiting for a passenger using the example 600 of FIG. 6. Although these examples are useful for demonstration purposes, they should not be considered limiting; a vehicle may block or inconvenience other road users in an infinite number of ways.

Figure 7:
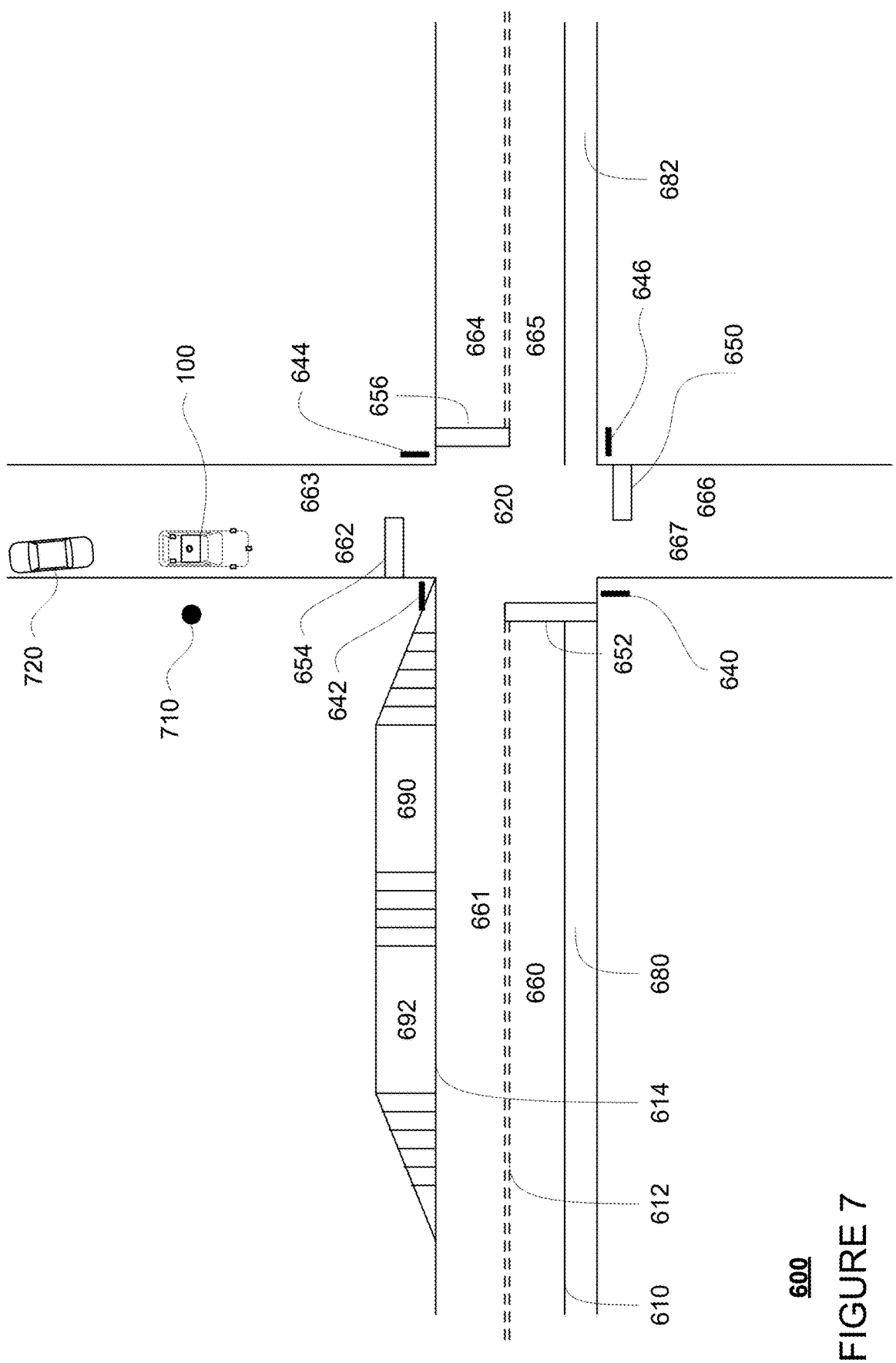
FIGS. 7-11 are examples of various situations in accordance with aspects of the disclosure.
Figure 8:
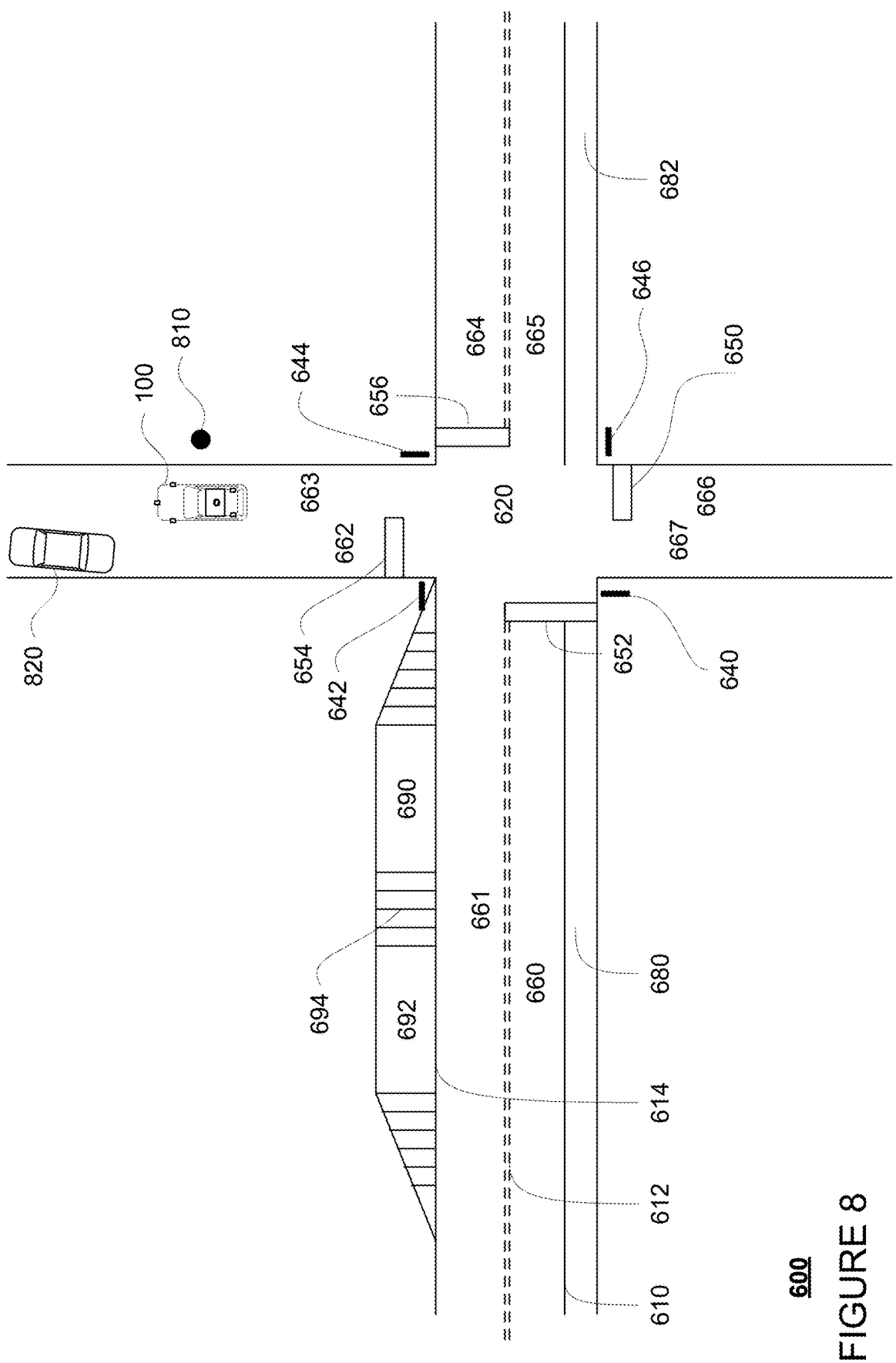
Figure 9:
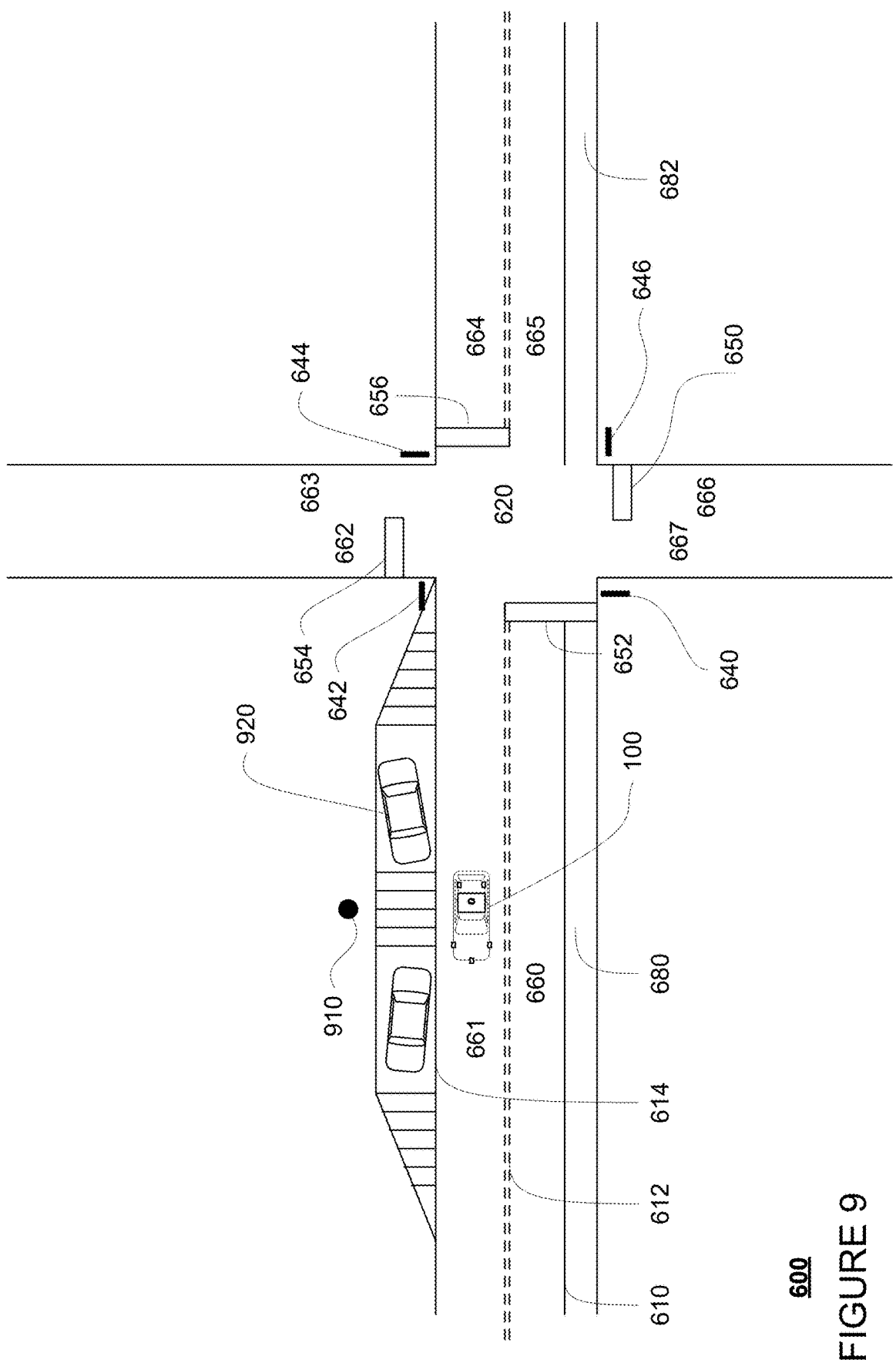
Figure 10:
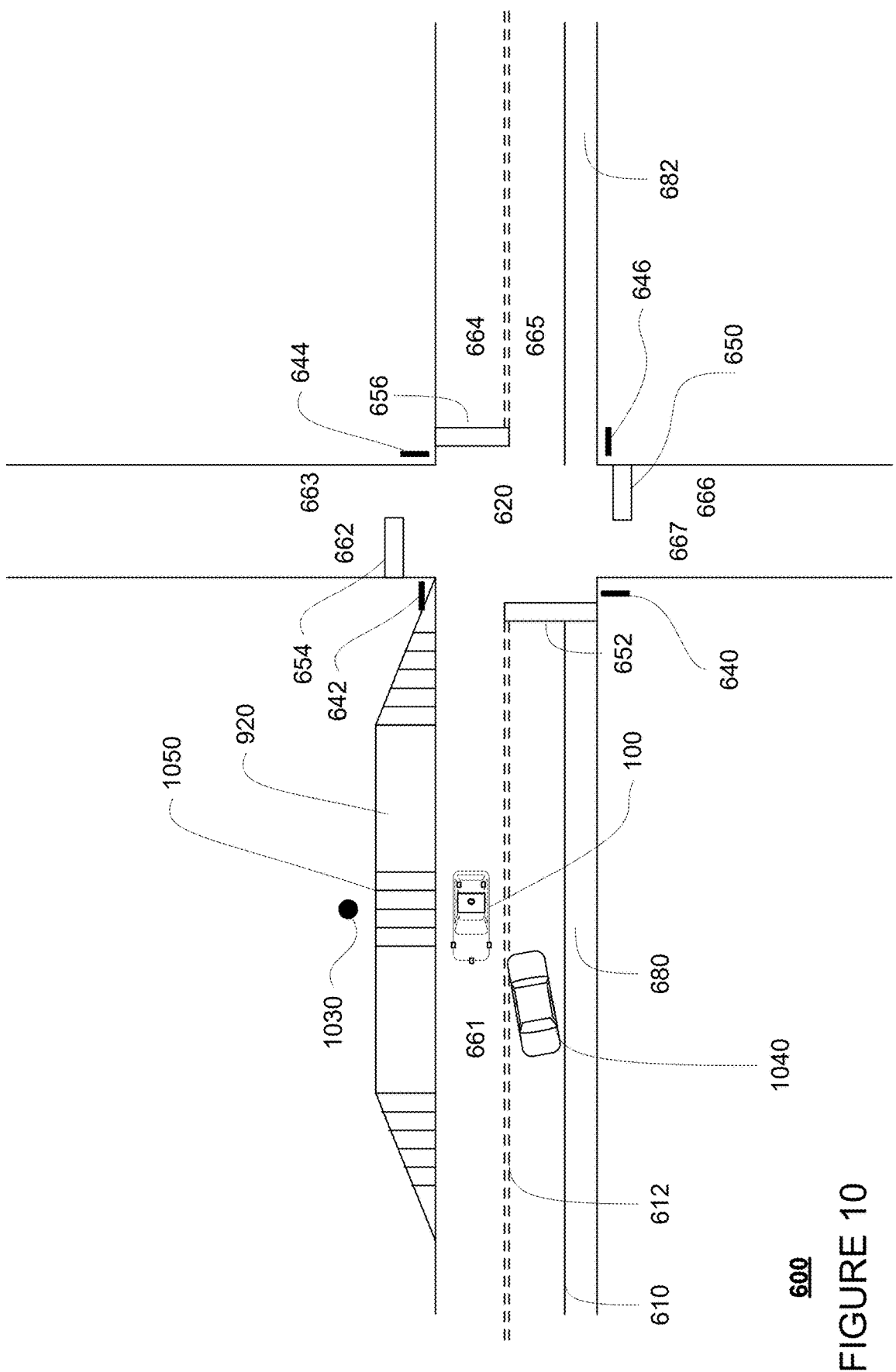
Figure 11:
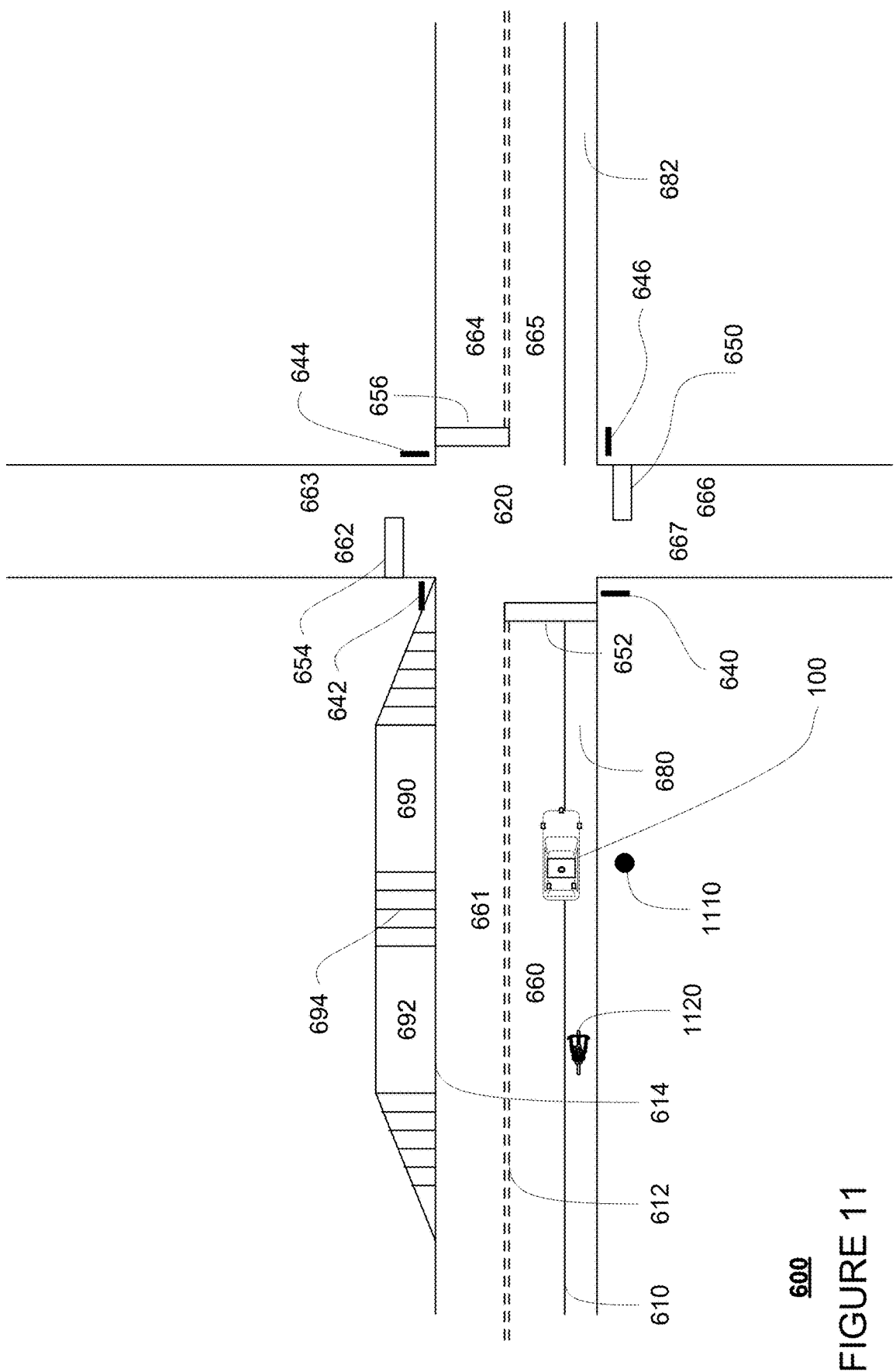

For instance, turning to FIG. 7, vehicle 100 may be stopped in lane 662 adjacent to a pickup location 710 and waiting for a passenger. In this example, a second vehicle 720 may be approaching vehicle 100 from behind. In this regard, vehicle 100 may be blocking and inconveniencing second vehicle 720. As shown in FIG. 8, vehicle 100 may be stopped in lane 663 adjacent to a pickup location 810 and waiting for a passenger. In this example, a second vehicle 820 may be approaching vehicle 100 from an adjacent lane 662. In this regard, vehicle 100 may be blocking and inconveniencing second vehicle 820. Turning to FIG. 9, vehicle 100 may be stopped in lane 661 adjacent to a pickup location 910 and waiting for a passenger. In this example, a second vehicle 920 may be parked in parking spot 690 and attempting to "unpark" or rather, waiting to pull out into lane 661. In this regard, vehicle 100 may be blocking and inconveniencing second vehicle 920. FIG. 10 provides a similar example of vehicle 100 stopped adjacent to a pickup location 1030 and blocking a second vehicle 1040 from turning into and reaching an adjacent area 1050 corresponding to a driveway. In this regard, vehicle 100 may be blocking and inconveniencing second vehicle 1040. As shown in FIG. 11, vehicle 100 may be stopped in lane 660 adjacent to a pickup location 1110 and waiting for a passenger. In this example, vehicle 100 is at least partially blocking the bicycle lane 680, and a bicyclist 1120 is approaching vehicle 100 from behind.

As one approach, when stopped, computing devices 110 may request assistance at consistent, increasing and/or decreasing time intervals from remote operators as to whether the vehicle should move along based on whether the vehicle is blocking or otherwise inconveniencing other road users. For instance, the computing devices 110 may send a request for assistance via network 460 to remote operator 442's remote operator work station 440. This request may include one or more still and/or video images of the vehicle's surroundings captured by the perception system 172. In response, the remote operator 442 may review the images of the vehicle's surroundings and instruct the vehicle's computing devices 110 to stay put or move along depending on the flow of traffic around the vehicle 100. Of course, this back-and-forth over the network 460 can take time, which can cause annoyance and inconvenience to other road users. To reduce or even eliminate the need for the autonomous vehicles to call a remote operator in such situations, the computing devices 110 may automatically identify situations in which the vehicle is inconveniencing other drivers and thereafter attempt to reduce that inconvenience.

In order to do so, when stopped, the computing devices 110 may receive sensor data from the vehicle's perception system 172. This sensor data may then be used to determine whether the vehicle is inconveniencing other road users, such as by blocking traffic or causing other road users to have to move around the vehicle. For instance, the computing devices 110 may determine whether the vehicle is preventing other road users from proceeding or causing those road users to have to drive around the vehicle as discussed further below. As an example, the computing devices may determine whether another vehicle has stopped close behind the vehicle, in other words, so as to be "tailgating."

In addition or alternatively, as noted above, the computing devices 110 may receive output from various behavior prediction models. For instance, for each road user of a given type identified from the sensor data provided by the perception system 172, the vehicle's computing devices may use a corresponding behavior prediction model for that type (for instance, vehicle, pedestrian, bicyclist, etc.) to output a future behavior or trajectory for that road user. In some instances, these behavior models may also identify whether the other road user's behavior or trajectory is responsive to the vehicle being slowed or stopped in its present location.

If the predictions change over time or if a prediction does not sufficiently correspond with the actual behavior of the other road user as the other road user approaches the vehicle and these changes or differences are caused by (i.e. in response to) the vehicle, this may indicate that the vehicle is blocking or inconveniencing the other road user. As an example, if the predicted behavior (or trajectory) includes the other road user proceeding in its lane adjacent to the vehicle or directly through the location of the vehicle, but the actual, observed behavior (or trajectory) has the other road user moving away from the vehicle (laterally) or stopping behind the vehicle, this may indicate that the vehicle is blocking or inconveniencing the other road user.

Figure 13:
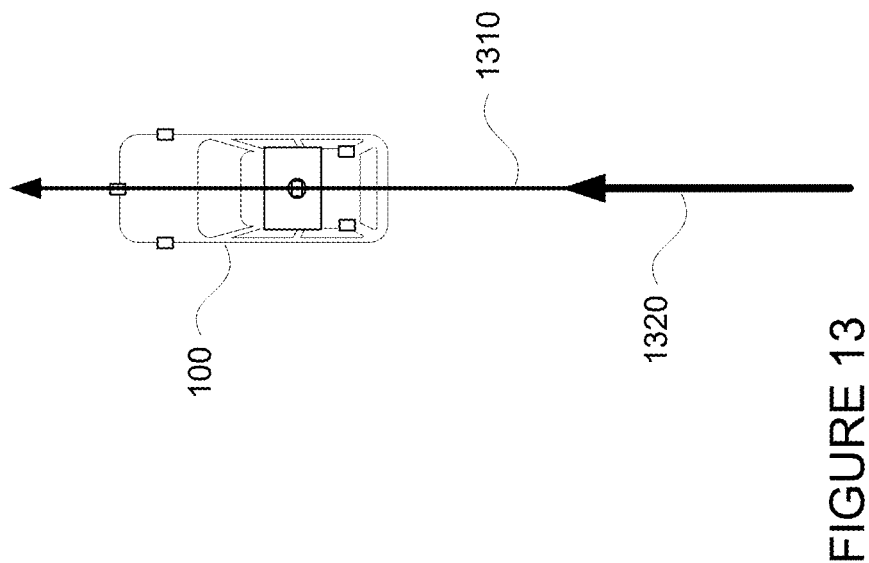
FIG. 13 is another example comparison of an actual trajectory and a predicted trajectory for a road user in accordance with aspects of the disclosure.
Figure 12:
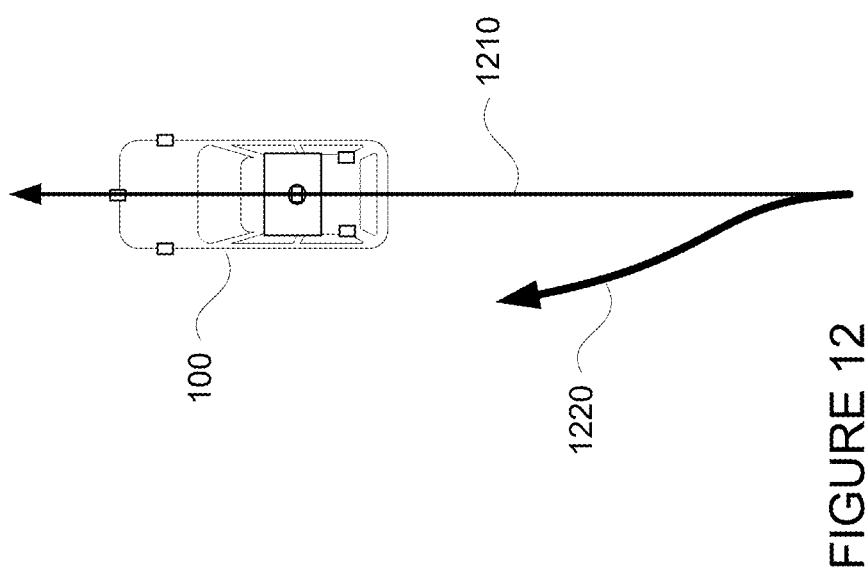
FIG. 12 is an example comparison of an actual trajectory and a predicted trajectory for a road user in accordance with aspects of the disclosure.

For instance, FIG. 12 depicts a predicted trajectory 1210 and an actual trajectory 1220 of a road user with respect to vehicle 100 when stopped, for instance as shown in the example of FIG. 7. In the example of FIG. 12, the predicted trajectory 1210 passes through the location of vehicle 100, but the actual trajectory 1220 has the other road user moving laterally away from the vehicle. FIG. 13 depicts a predicted trajectory 1210 and an actual trajectory 1320 of a road user with respect to vehicle 100 when stopped, for instance as shown in the example of FIG. 7. In the example of FIG. 13, the predicted trajectory 1310 passes through the location of vehicle 100, but the actual trajectory 1320 has the other road user stopping behind vehicles 100. The magnitude of this difference as well as how long another road user must for the vehicle to move may also indicate how much the vehicle is inconveniencing the other road user or whether the vehicle is completely blocking the other road user.

Once the vehicle is determined to be inconveniencing another road user while stopped, the computing devices 110 may evaluate or determine a value for that inconvenience. In order to allow the computing devices 110 to quickly assess the inconvenience to another road user, a model may be used to provide an inconvenience value for only those other road users detected by the vehicle's perception system as being blocked or inconvenienced by the vehicle as discussed above. For instance, the model may include a machine learning model, such as a deep neural network or other types of machine learning models.

The model may be trained "offline", for instance, by one or more of server computing devices 410, and sent via network 460 or otherwise downloaded to memory 130 of computing devices 110 for later use. The training data for the model may include using sensor data generated by a vehicle's perception system with labeled instances including locations the vehicle is identified to be blocking and/or inconveniencing other traffic. These labels may be generated, for instance, based on the aforementioned determinations by remote operators for different vehicles and further labeling those determinations with an inconvenience value. This inconvenience value may be a value selected by the remote operator on some predefined scale, such as 0 to 1 or 1 to 10, etc. when the remote operator is reviewing the images of a vehicle's environment. The sensor data may include all of the data generated by the corresponding vehicle's perception system, or more streamlined information, such as the pose, velocity, acceleration and similar data for each road user detected by the perception system over some period of time. The model may be trained using the training data in order to provide a value indicative of how likely the vehicle is blocking and/or inconveniencing the aforementioned road users when the vehicle is stopped at a given location (typically the location where the vehicle is currently stopped) and thereafter sent to the vehicles of the fleet.

Alternatively, the model may be used to determine whether the vehicle is inconveniencing any other road users whenever the vehicle is stopped, regardless of the output of the various behavior models.

The output of the model may be used to determine an appropriate response. For instance, the value may be compared to a threshold value to determine whether the vehicle blocking and/or inconveniencing other road users such that the vehicle should move. As an example, if the value is on a scale of 0 to 1, where 1 is very high inconvenience to the other road user, there may be a predetermined threshold somewhere in between (for example, 0.7 or more or less). When the threshold is not met, the vehicle's computing devices, the computing devices may determine that vehicle 100 is not inconveniencing another road user. In this case, the computing devices 110 may respond by keeping the vehicle 100 at its current location. When the threshold is met, the vehicle's computing devices determine that the vehicle is inconveniencing another road user. In this case, the computing devices 110 may respond by moving the vehicle in order to reduce the value.

How the vehicle is moved may depend on how the vehicle is blocking or inconveniencing other traffic. For instance, based on the relative position of the road user identified as being inconvenienced by the model, the computing devices may choose a different type of movement. For example, if the vehicle is inconveniencing a road user in an adjacent lane such as in the example of FIG. 8, the computing devices 110 may move the vehicle forward and/or to the right (in a right-hand drive country). As another example, if the vehicle is inconveniencing another road user that is behind the vehicle such as in the example of FIG. 7, the vehicle's computing devices may attempt to move the vehicle further to the right (in a right-hand drive country) in order to allow the another road user to pass the vehicle on the left. These movements, in turn, may actually reduce the value.

In yet another example, the vehicle's computing devices may attempt to search for a new location with a lower value using the model. For instance, the vehicle's computing devices may search nearby stopping locations that are further out the way of the road user and not blocking where the vehicle's computing devices predict that the road user is attempting to go, potentially at the expense of being less convenient to the passenger that is being picked up. The computing devices 110 may then input these new locations and sensor data from the perception system into the model in order to determine an inconvenience value for the new locations. The new location with the lowest value may then be selected. Alternatively, the map may include data identifying an estimated inconvenience value for different stopping locations. In this regard, the computing devices may simply search and select new location with a lower inconvenience value than the vehicle's current location.

Once a new location is selected, the computing devices 110 may control the vehicle in order to move to that lower value location. If the computing devices 110 are unable to find a location with a lower value, the vehicle's computing devices may send a message to a passenger of the vehicle (for example, to the passenger's client computing device for display) indicating that the vehicle is going to move to a new location. The vehicle's computing devices may also control the vehicle in order to proceed forward. At the same time, the vehicle's computing devices may attempt to identify this new location, for instance, by searching over pre-mapped pull over locations or attempting to identify nearby parking areas that are within some distance of the vehicle's current location.

Figure 14:
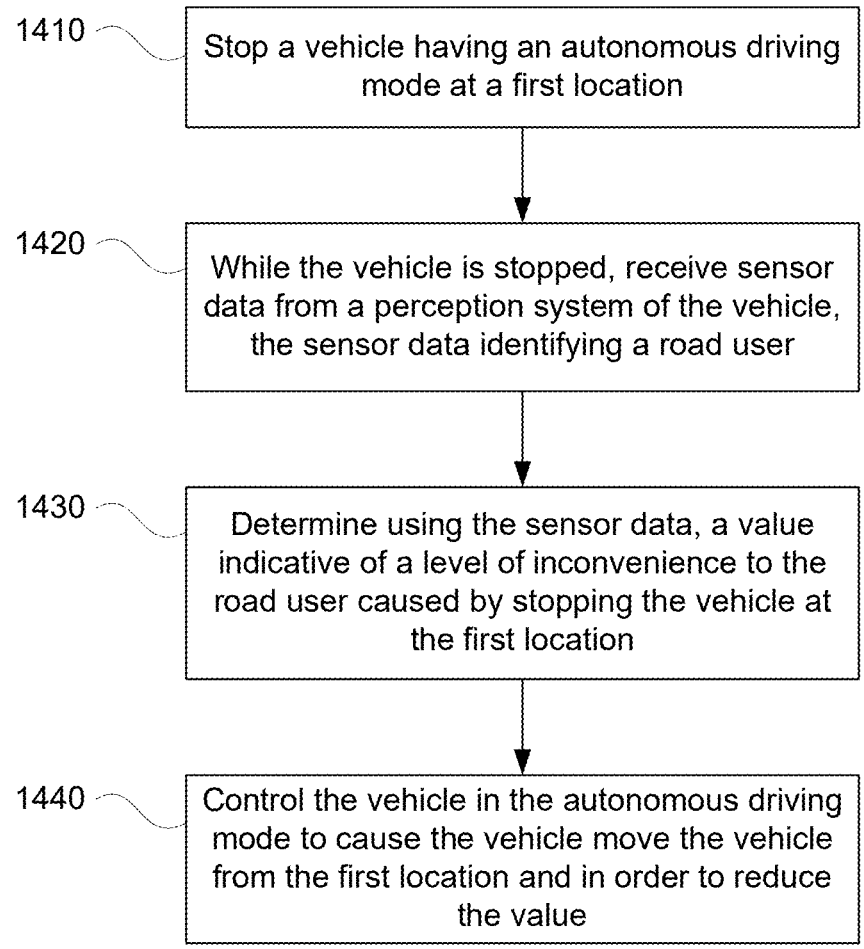
FIG. 14 is flow diagram in accordance with aspects of the disclosure.

FIG. 14 is a flow diagram 1400 that may be performed by one or more processors such as one or more processors 120 of computing device 110. In this example, at block 1410, a vehicle having an autonomous driving mode is stopped at a first location. At block 1420, while the vehicle is stopped, sensor data is received from a perception system of the vehicle. This sensor data identifiers a road user. At block 1430, using the sensor data, a value indicative of a level of inconvenience to the road user caused by stopping the vehicle at the first location is determined. At block 1440, the vehicle is controlled in the autonomous driving mode in order to move the vehicle from the first location in order to reduce the value.

The features described herein may enable autonomous vehicles to make independent determinations as to whether to move from a pick up location when waiting for a passenger to arrive. This may reduce or even eliminate the need for remote operators to make these decisions while also reducing the time it takes for the vehicle to react to such situations. This reduction in time may also increase the safety of the vehicle which may be able to respond much faster as the vehicle is able to continuously monitor its environment and anticipate inconvenience to other road users. At the same time, by allowing the vehicle to automatically determine that it is blocking or inconveniencing other road users, the vehicle may be more responsive to its environment and less likely to block, inconvenience, and in some cases, annoy, other road users.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method of reducing inconvenience to a road user caused by an autonomous vehicle, the method comprising:
   generating, by one or more processors of the autonomous vehicle, an inconvenience value using a behavior prediction model and sensor data identifying the road user, the inconvenience value indicating how much the autonomous vehicle is inconveniencing the road user;
   comparing, by the one or more processors, the inconvenience value to a threshold value; and
   controlling, by the one or more processors, the autonomous vehicle to avoid blocking the road user when the inconvenience value is equal to or greater than the threshold value.

2. The method of claim 1, wherein the sensor data is generated by a perception system of the autonomous vehicle.

3. The method of claim 1, wherein the behavior prediction model is configured to determine a future behavior or trajectory of the road user.

4. The method of claim 1, wherein the inconvenience value is on a scale of 0 to 1.

5. The method of claim 1, wherein the inconvenience value is on a scale of 1 to 10.

6. The method of claim 1, wherein when the inconvenience value is less than the threshold value, the autonomous vehicle remains at its current location.

7. The method of claim 1, wherein the road user is one of a vehicle, a pedestrian or a bicyclist.

8. The method of claim 1, wherein the behavior prediction model includes a machine learning model.

9. The method of claim 8, wherein the machine learning model is a deep neural network.

10. The method of claim 1, wherein the inconvenience value is generated based on a predicted trajectory and an actual trajectory of the road user with respect to the autonomous vehicle, when stopped.

11. A system for reducing inconvenience to a road user caused by an autonomous vehicle, the system comprising:
   a perception system configured to generate sensor data identifying the road user;
   a memory configured to store a behavior prediction model; and
   one or more processors coupled to the perception system and the memory, the one or more processors configured to:
      receive an inconvenience value generated using the behavior prediction model and the sensor data, the inconvenience value indicating how much the autonomous vehicle is inconveniencing the road user;
      compare the inconvenience value to a threshold value; and
      control the autonomous vehicle to avoid blocking the road user when the inconvenience value is equal to or greater than the threshold value.

12. The system of claim 11, wherein the behavior prediction model is configured to determine a future behavior or trajectory of the road user.

13. The system of claim 11, wherein the inconvenience value is on a scale of 0 to 1.

14. The system of claim 11, wherein the inconvenience value is on a scale of 1 to 10.

15. The system of claim 11, wherein when the inconvenience value is less than the threshold value, the autonomous vehicle remains at its current location.

16. The system of claim 11, wherein the road user is one of a vehicle, a pedestrian or a bicyclist.

17. An autonomous vehicle comprising:
   a perception system configured to generate sensor data identifying a road user;
   a memory configured to store a behavior prediction model; and
   one or more processors coupled to the perception system and the memory, the one or more processors configured to:
      receive an inconvenience value generated using the behavior prediction model and the sensor data, the inconvenience value indicating how much the autonomous vehicle is inconveniencing the road user;
      compare the inconvenience value to a threshold value; and
      control the autonomous vehicle to avoid blocking the road user when the inconvenience value is equal to or greater than the threshold value.

18. The autonomous vehicle of claim 17, wherein the behavior prediction model is configured to determine a future behavior or trajectory of the road user.

19. The autonomous vehicle of claim 17, wherein the inconvenience value is on a scale of 0 to 1.

20. The autonomous vehicle of claim 17, wherein the inconvenience value is on a scale of 1 to 10.

* * * * *